United States Patent

[11] 3,594,800

| | | | |
|---|---|---|---|
| [72] | Inventor | William E. Stoney Whittier, Calif. | |
| [21] | Appl. No. | 566,970 | |
| [22] | Filed | July 21, 1966 | |
| [45] | Patented | July 20, 1971 | |
| [73] | Assignee | North American Rockwell Corporation | |

[54] MOVING TARGET ANGLE TRACKING SYSTEM
6 Claims, 4 Drawing Figs.

[52] U.S. Cl.................................................. 343/7.7, 343/16 M
[51] Int. Cl..................................................... G01s 9/42
[50] Field of Search........................................... 343/16 SD, 7.7, 17.1

[56] References Cited
UNITED STATES PATENTS
3,267,468  8/1966  Stull, Jr. ........................ 343/7.7
3,309,701  3/1967  Bollinger et al. ............... 343/7.7 X

*Primary Examiner*—Malcolm F. Hubler
*Attorneys*—William R. Lane, L. Lee Humphries and Rolf M. Pitts ABSTRACT: Means for reducing marginal tracking conditions in a clutter-referenced, moving target tracking system of the monopulse type. An early ground return receiver signal is stored and stretched for use as a coherent reference in the coherent detection of received range trace signals, to provide clutter-referenced range trace signals. Such clutter-referenced signals may then be both doppler processed to distinguish a moving target component thereof, and further processed to provide angle-tracking signals having a sense indicative of the sense of direction of the detected moving target.

INVENTOR.
WILLIAM E. STONEY

INVENTOR.
WILLIAM E. STONEY

BY Roy M Pitts

ATTORNEY

MOVING TARGET ANGLE TRACKING SYSTEM

MOVING TARGET ANGLE TRACKING SYSTEM

The subject invention relates to a target angle-tracking system for distinguishing a moving target moving relative to a clutter background, and more particularly to means for reducing marginal tracking conditions in a clutter referenced, moving target tracking system.

Radar angle tracking of moving targets in ground clutter, using clutter-referenced doppler processing, requires not only the presence of the clutter reference, but also, that the clutter reference be of an amplitude sufficiently greater than that of the target. For conditions where the clutter signals become weaker than the target signals, the target signal becomes the doppler reference and the angle tracking signals derived from the doppler processor are in error. Under conditions of weak clutter return or radar shadows (which prevent a clutter return at the target range), the resulting clutter reference may be insufficient in a clutter referenced angle system to provide detection of the target-clutter doppler beat frequency signals with the correct sense for angle-tracking purposes. Under such tracking conditions, referred to as a twilight region of angle tracking, the clutter-referenced angle-tracking system tends to wander off the target and a loss of tracking may result.

A means of overcoming the effect of twilight clutter regions upon clutter-reference moving-target tracking system performance has been the attempt to fortify the clutter component of the clutter-referenced signal by delaying the received signal by an interval corresponding to 2 or 3 pulsewidths of the pulse-type radar system, and then combining the delayed signal and the received signal, as described more fully in my copending Application Ser. No. 556,940 filed June 13, 1966 now Pat. No. 3,365,715. However, a shortcoming of such technique is the reliance on an adequate clutter reference within several pulsewidths of the target range, where, in fact radar shadows may commonly prevent a clutter return at any radar range within several pulsewidth intervals of the target range.

By means of the concept of the subject invention, the shortcomings and disadvantages of the prior art in effecting moving-target angle tracking in a twilight clutter region are overcome.

In accordance with a preferred embodiment of the subject invention, there is provided an angle-tracking radar employing clutter-referenced doppler processing. There is also provided means for storing and stretching an early ground return receiver signal as a clutter reference. Such stored clutter reference is then employed as a coherent reference in the coherent detection of received signals for any range of interest to provide clutter-referenced signals. Such clutter-referenced signals may then be both doppler-processed to select a moving target component thereof, and further processed to provide angle-tracking signals having a sense indicative of the sense of the direction of the detected moving target.

Because an early-return signal is employed as the stored coherent reference, the system is not subject to the effects of radar shadows and weak clutter return signals, and improved tracking accuracy is obtained. Accordingly, an object of the subject invention is to provide a moving target tracking system demonstrating improved performance.

Another object of the invention is to provide a moving target tracking system having improved angle tracking properties.

A further object of the invention is to provide a clutter-referenced angle-tracking system having reduced twilight clutter regions of performance.

Yet another object is to provide a clutter-referenced angle-tracking system that is not subject to radar shadows at ranges corresponding to those of a moving target-to-be-tracked.

A still further object is to provide a coherently detected signal, employing a stored early-clutter sample as a coherent reference, whereby an improved clutter-referenced signal is generated.

These and further objects of the invention will become apparent from the following description in conjunction with the accompanying drawings, in which.

Figure 1:
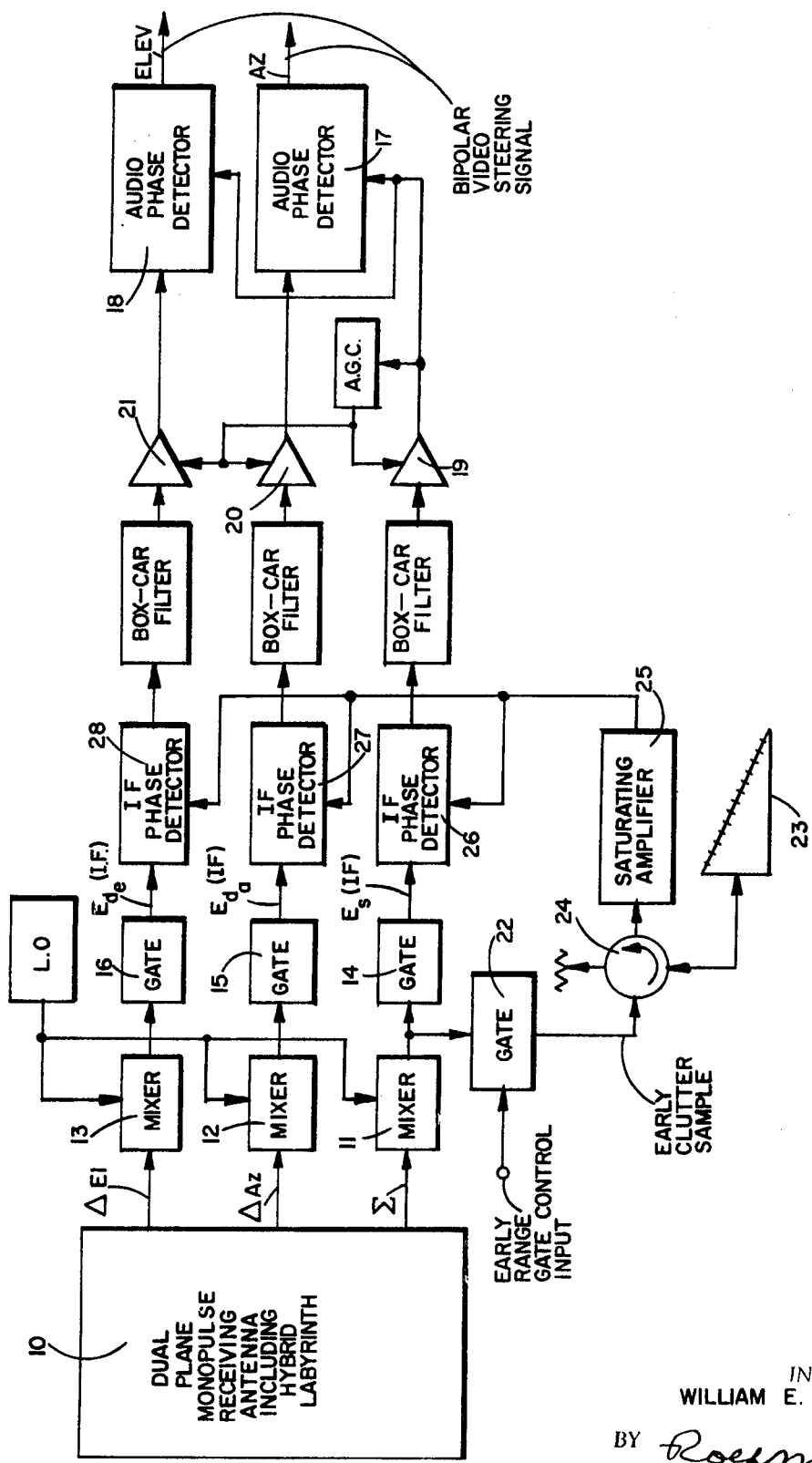
FIG. 1 is a block diagram of a preferred embodiment of the inventive concept.

Referring now, to FIG. 1, there is illustrated in block diagram form a preferred embodiment of the subject invention. There is provided a dual-plane monopulse receiver, comprising a four-horn monopulse antenna (and associated microwave hybrid) 10 and respective mixer-amplifier stages 11, 12 and 13 for forming a monopulse sum signal, and monopulse azimuth and elevation difference signals, respectively, at an intermediate frequency.

Such intermediate frequency monopulse receiver signals are preferably gated-on during a periodic time interval corresponding to the radar range of a detected target of interest by means of gates 14, 15 and 16 in cooperation with a range tracking unit (not shown), which latter unit does not comprise an aspect of the invention. A first and second phase sensitive detector 17 and 18 responsively coupled to a respective one of the two monopulse difference signal channels, and employing the automatic gain controlled monopulse sum channel as a phase reference derived through amplifier 19, provide bipolar video azimuth and elevation steering signals. Because the outputs of the phase-sensitive detectors 17 and 18 tend to vary as the product of the inputs thereto, as is well understood in the art, such output may be normalized relative to the sum channel signal level by means of automatic gain control stages 19, 20 and 21 included in each of the three monopulse signal channels, each such stage having a gain control input commonly connected to the output of the sum channel, as is well understood in the monopulse radar art.

Interposed between the normalized inputs to the steering signal phase detectors 17 and 18 and an associated mixer amplifier stage 11, 12 and 13 is clutter-referenced doppler processing means having improved performance in twilight clutter regions. Such signal processing means comprises means responsive to an early-received clutter sample of the sum channel output for providing a time-stretched and stored clutter-reference signal. Such clutter-sampling means includes a gate 22 operatively connected to the output of monopulse sum channel mixer 11 and responsive to an early range gate control input for providing an early clutter sample to a single-terminal roughened and tapered delay line element 23 via a transmit-receive switch such as a three-port circulator 24 or the like. Such early gating control signal may be provided by preselectively delaying the system trigger of the radar transmitter (not shown) with which the receiver of FIG. 1 is intended to cooperate, and applying such delayed periodic signal to the control input of gate by means well understood in the art.

Such sampled early clutter return is essentially stored and stretched in time duration without substantial alteration of the spectral content thereof and is fed to a high-gain saturating amplifier 25 coupled to wedge delay line 23 through T-R means 24. Saturating amplifier 25 responds to such time-stretched clutter spectra to provide a phase reference signal of substantially invariant amplitude. Such clutter-phase signal is then applied as a phase-reference to an intermediate frequency phase-sensitive detector 26, 27 and 28 interposed at the gated intermediate frequency outputs of gates 14, 15 and 16.

The construction, arrangement, and cooperation of elements 23, 24 and 25 are more fully described in U.S. application Ser. No. 389,299 filed Aug. 13, 1964 by C. A. Wiley, now Pat. No. 3,483,558 assignor to North American Aviation, Inc., assignee of the subject invention. The construction and arrangement phase detectors 26, 27 and 28 are also known in the art, as indicated for example in U.S. Pat. No. 3,167,740 issued Jan. 12, 1965, to W. E. Stoney.

Because the phase reference input to phase detectors 26, 27 and 28 represents the phase of the spectral content of the time-stretched early-clutter sample, the outputs of such phase detectors are clutter-referenced, coherently detected signals. In other words, such signals include an AC component corresponding to a doppler-shifted moving target and may include a DC component corresponding to a clutter return. Accordingly, the outputs of IF detectors 26, 27 and 28 may be boxcar detected and then high pass, or doppler filtered, to remove any DC clutter component, and retain the boxcar component corresponding to the moving target echo. Such boxcar detection and filter techniques are well-known in the art, and are therefore indicated schematically in FIG. 1 by boxcar filters 29, 30 and 31. Hence, it is to be appreciated that the monopulse sum and difference signal components, indicative of a moving target, are distinguished from a possible clutter return from the target range, with the relative phase between such moving target monopulse signals preserved. Hence, the moving target monopulse difference signals may be again phase-detected, employing the moving target sum signal as a phase reference, to obtain bipolar steering signals indicative of the direction of the moving target-to-be-tracked.

Figure 2:
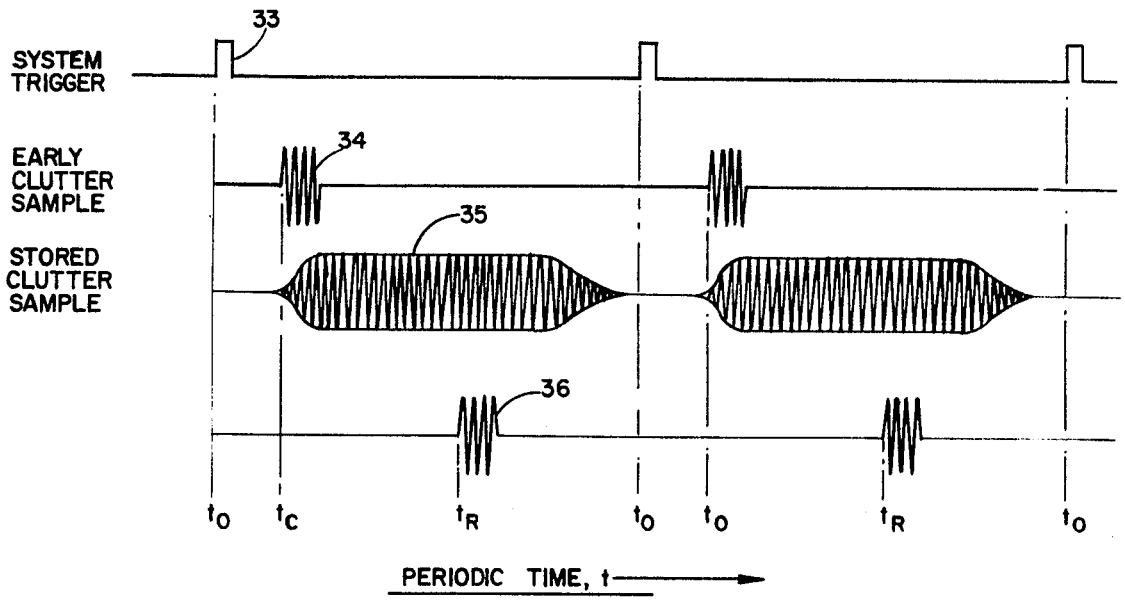
FIG. 2 is a family of time histories, illustrating exemplary responses of several elements of the device of FIG. 1.
Figure 3:
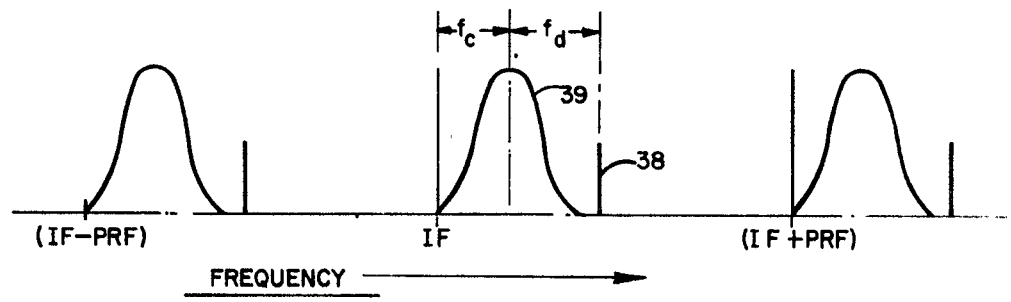
FIG. 3 is a spectral diagram of the response of an exemplary one of the gated intermediate frequency outputs of the gated mixer-amplifier stages of FIG. 1.
Figure 4:
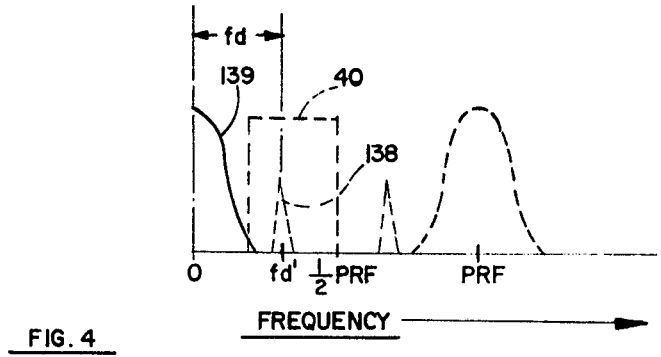
FIG. 4 is a spectral diagram of the output of an exemplary one of the intermediate-frequency phase-detectors of FIG. 1, illustrating the clutter-referenced nature of such outputs.

The nature of the cooperation of the system of FIG. 1 may be more easily appreciated from a consideration of FIGS. 2, 3 and 4.

Referring to FIG. 2, there is illustrated a family of time histories of the responses of several components of a system embodying the inventive concept. Curves 33, 34, 35 and 36 represent, respectively, a system trigger (of an exemplary transmitter with which the receiver of FIG. 1 is intended to cooperate), an early clutter sample output of gate 22 (in response to the delay $t_c$ and application of pulse 33 as a gate control input), the intermediate frequency clutter phase reference output of amplifier 25, and a range-gated intermediate frequency receiver signal output from one of gates 14, 15 and 16. Because of the successively spaced discrete reflecting surfaces of roughened, tapered delay element 23, element 23 continues to provide an output to amplifier 25 for a substantial portion of the pulse repetition interval subsequent to the application of the early clutter sample $(t_c-t_o)$, while the substantially flat amplitude envelope of Curve 35 is due to the saturation-amplification of the delay line output by amplifier 25. Therefore, a coherent clutter phase reference is supplied for all target ranges of interest, including range time, $t_R$, corresponding to the occurrence of target signal 36. Hence, it is not necessary to include automatic mode-switching means in the arrangement of FIG. 1 for switching between a clutter-referenced doppler processing mode and a pulsed data mode of processing. Because such additional mode switching equipment is not required, the reliability of the equipment is improved and equipment production costs are reduced.

Referring to FIG. 3, there is illustrated an exemplary spectral response of the intermediate frequency output of one of gates 14, 15 and 16 of FIG. 1. Spectral line 38 corresponds to the doppler shift of an intermediate-frequency moving-target signal, relative to the receiver IF center frequency; and cusp 39 corresponds to the spectral distribution of a clutter return at the target range, in the case of a clutter-referenced signal, the center frequency of which is shifted by the amount $f_c$ due to the motion of the radar platform relative to the clutter. Such larger spectral distribution of the clutter return is due to the wider antenna look-angle over which the clutter return occurs, due to its greater radial and azimuthal extend, as is well understood in the art. The difference frequency $f_d$ between the center frequency of clutter cusp 38 and moving-target spectral line 38 is due to the radial motion of the target to the radar, relative to the clutter source. However, even in the absence of a clutter return at the target range time ($t_R$ in FIG. 2), the target spectral line would still occur at ($f_c+f_d$) in FIG. 3.

By employing the early clutter return as a phase reference in the coherent detection of the range-gated intermediate frequency signals, a substantially clutter-referenced spectral distribution occurs at the output of detectors 26, 27 and 28 (of FIG. 1) as shown in FIG. 4. Spectral line 138 occurs at $f_d$ whether or not a received clutter cusp 139 is folded about zero or DC, which spectral line 138 may be distinguished from the clutter spectrum (if present) by means of a doppler band pass filter, the band-pass of which may correspond to Curve 40. Because the doppler processor of FIG. 1 employs coherent detection of the moving target signal relative to the clutter reference, less spectral distribution will occur in the clutter referenced moving target signal 138 and a higher energy level per cycle will result, making easier the detection of threshold level target signals at target speeds corresponding to the skirt of a clutter spectral distribution.

Therefore, it is to be understood that moving target tracking means has been described which enables the clutter-referenced tracking of targets even when a potential clutter source at the target range lies within a radar shadow due to intervening terrain prominences. Also, because a stored early clutter sample is employed, a clutter reference is provided at all target ranges of interest, whereby mode selection equipment for switching between doppler processing and pulse processing need not be included. Moreover, because coherent detection is employed, an improved energy level per cycle results which enhances the detection of threshold level targets. Accordingly, an improved moving target tracking system has been described.

Although the invention has been illustrated and described in detail, it is to be clearly understood that the same is by way of illustration and example only and is not to be taken by way of limitation, the spirit and scope of this invention being limited only by the terms of the appended claims.

I claim:

1. In a clutter-referenced moving target tracking employing a dual plane monopulse range-tracking receiver having a range-gated intermediate frequency stage providing monopulse sum and difference channel outputs, means for reducing the system threshold of performance called the twilight clutter region where clutter signal strength approximates target signal strength, comprising:

Means responsive to an early-received clutter sample of said sum channel output for providing a time-stretched and stored clutter reference signal, and Phase sensitive detection means interposed at each of said monopulse outputs for providing phase-detected clutter-referenced monopulse sum and difference signals.

2. The device of claim 1 in which there is further provided:

high pass filter means responsive to each of said phase-detected, range-gated monopulse outputs for attenuating a clutter reference component in said clutter referenced monopulse signals to provide filtered monopulse signals, and phase-sensitive video detection means coupled to each of said filtered monopulse difference signals and having a phase-reference input commonly responsive to said filtered monopulse sum signal for providing bipolar video target angle tracking signals.

3. The device of claim 2 in which signal-normalizing means is included in said monopulse signal channels and comprising automatic gain controlled means interposed at the output of each of said high pass filters and having a gain-control input commonly responsive to the normalized monopulse sum channel output, said phase-reference inputs of said audio phase-detectors being responsive to the output of said normalized monopulse sum channel output.

4. The device of claim 2 in which said means for providing a clutter reference signal comprises:

a one terminal roughened tapered delay line, and input of which is responsive to said early clutter sample; and a high-gain saturating amplifier responsive to the output of said delay line for providing a substantially constant amplitude phase reference.

5. In a dual-plane monopulse tracking system, including means for providing a first and second sum-channel-normalized, phase-detected, bipolar video, tracking angle signal, a combination for distinguishing a moving target signal from a marginal clutter reference, comprising:

Means responsive to an early-received clutter sample of a monopulse sum channel of said receiver for providing a time-stretched and stored clutter reference;

Phase-sensitive detection means interposed between each of a sum and two difference channel receiver outputs of said dual-plane monopulse tracking system and signal normalizing means thereof and having a phase-reference input responsive to said clutter reference for providing an associated clutter referenced moving target signal; and Band-pass filter means interposed at the output of each of said phase sensitive detection means for attenuating a clutter reference component in said clutter-referenced moving target signal.

6. The device of claim 5 in which said means for providing a clutter reference comprises:

A tapered one-terminal delay line element;

A duplexer coupled to the terminal of said delay line element, a receiving terminal of said duplexer being coupled to an early-gated output of a monopulse sum channel of said receiver; and A saturating amplifier intercoupling said phase reference inputs of said phase detection means and a transmitting terminal of said duplexer.